(12) United States Patent
DeLaCruz et al.

(10) Patent No.: US 8,631,438 B2
(45) Date of Patent: *Jan. 14, 2014

(54) UNIVERSAL AND PORTABLE CHANNEL DESIGNATIONS

(71) Applicants: Cedric DeLaCruz, West Hartford, CT (US); Timothy Lubecki, North Haven, CT (US)

(72) Inventors: Cedric DeLaCruz, West Hartford, CT (US); Timothy Lubecki, North Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/868,329

(22) Filed: Apr. 23, 2013

(65) Prior Publication Data

US 2013/0268971 A1    Oct. 10, 2013

Related U.S. Application Data

(63) Continuation of application No. 12/313,413, filed on Nov. 19, 2008, now Pat. No. 8,528,020.

(60) Provisional application No. 61/003,804, filed on Nov. 20, 2007.

(51) Int. Cl.
*G06F 3/00* (2006.01)
*G06F 13/00* (2006.01)
*H04N 5/445* (2011.01)

(52) U.S. Cl.
USPC ............... 725/49; 725/44; 725/50; 725/52; 725/59; 725/132; 725/140; 725/152; 348/734

(58) Field of Classification Search
None
See application file for complete search history.

(56) References Cited

U.S. PATENT DOCUMENTS

| | | | |
|---|---|---|---|
| 8,001,571 B1* | 8/2011 | Schwartz et al. | 725/53 |
| 2003/0066085 A1* | 4/2003 | Boyer et al. | 725/104 |
| 2005/0055716 A1* | 3/2005 | Louie et al. | 725/58 |
| 2007/0129003 A1* | 6/2007 | Dunko | 455/3.06 |
| 2007/0214484 A1* | 9/2007 | Taylor et al. | 725/100 |
| 2007/0300275 A1* | 12/2007 | Kim et al. | 725/112 |
| 2008/0039078 A1* | 2/2008 | Xu et al. | 455/432.1 |
| 2008/0127291 A1* | 5/2008 | Xu et al. | 725/118 |

* cited by examiner

*Primary Examiner* — Jason J Chung
(74) *Attorney, Agent, or Firm* — Timothy Lubecki

(57) ABSTRACT

Systems and methods are described that provide favorite channel designation portability from a variety of locations, devices and/or programming service providers.

18 Claims, 10 Drawing Sheets

UNIVERSAL AND PORTABLE CHANNEL DESIGNATIONS

CROSS REFERENCE TO RELATED APPLICATIONS

This application is a continuation of co-pending U.S. patent application Ser. No. 12/313,413, entitled "UNIVERSAL AND PORTABLE CHANNEL DESIGNATIONS," filed on Nov. 19, 2008, which claims the benefit of U.S. Provisional Application No. 61/003,804, filed on Nov. 20, 2007, the disclosure of which is incorporated herein by reference in its entirety.

BACKGROUND OF THE INVENTION

The invention relates generally to Electronic Program Guides (EPGs). More specifically, the invention relates to systems and methods that allow a viewer to access network programming using channel references made at a preferred region at any region where the same network programming is made available.

Today, cable and satellite television systems are commonplace and offer virtually unlimited program content. Each network broadcast is frequency-shifted to channels at a cable or satellite provider headend instead of the final viewing location. A cable set-top box (converter) transposes any of the available channels from the cable headend to a single channel. While many televisions are cable ready with a standard converter built-in, the existence of premium television pay-per-view and on-demand programming require a set-top box for cable or satellite television reception.

Most cable and satellite television service providers divide their channel lineups into three or four basic channel packages. The basic programming package is known as basic cable and provides access to a large number of cable TV channels, as well as broadcast television networks such as CBS, ABC, NBC, PBS, etc., and local access channels. In addition to the basic cable packages, most providers offer premium channel add-on packages offering either just one premium network or several premium networks for one price. Finally, most providers offer Pay-Per-View (PPV) channels where users can watch individual movies, live programs, sports, etc. for an additional fee for single viewing at a scheduled time. Some providers offer on-demand programming where customers can select programs from a list of offerings including recent releases of movies, concerts, sports, and reruns of television shows and specials and start the program whenever they wish.

Many providers operate as local monopolies in the United States, as one provider typically receives the right to serve a region as a result of a franchise agreement with a local government. The rise of Direct Broadcast Satellite systems providing the same programming content using small satellite receivers and Verizon Fiber Optic Service (FiOS) and other recent ventures by Incumbent Local Exchange Carriers (ILECS) such as AT&T U-verse compete with cable.

For network selection, providers typically rely on an Electronic Program Guide (EPG). An EPG is an on-screen guide to scheduled broadcast television or radio programs, typically with functions allowing a subscriber to navigate, select and discover content by channel, time, title, genre, etc. by use of a remote control, a keyboard, or other input devices. In conjunction with Program Delivery Control (PDC), content may also be scheduled for future recording by a Digital Video Recorder (DVR) or Personal Video Recorder (PVR). The on-screen information may be delivered by a dedicated channel or assembled by the set-top box from information sent by each program channel. The technology is based upon broadcasting data to an application usually residing within middleware in a set-top box which connects to the television set and enables the application to be displayed.

EPG technology is predominant in digital television and radio, but EPGs also include analog technology. Guide Plus+, for example, uses the Vertical Blanking Interval (VBI). These signals may arrive via cable TV, satellite TV, cable radio, satellite radio, or via over-the-air terrestrial broadcast radio and television stations.

By navigating through an EPG on a receiving device, subscribers can see more information about current network programming and future programming. When EPGs are coupled to PVRs, they enable a viewer to plan her viewing and record broadcast programs to a hard disk for later viewing.

Typical elements of an EPG comprise a Graphical User Interface (GUI) which enable the display of program titles, descriptive information such as a synopsis, actors, directors, year of production, and so on, the network name, the channel reference, programming from subchannels such as Pay-Per-View (PPV) and Video-On-Demand (VOD) services, program start times, genres and other descriptive metadata. EPG information is typically displayed as a grid with the option to select more information on each program. Radio EPGs offer more text-based displays of program name, program description, genre, on-air or off-air, series, artist, album, and track title information.

The latest EPG revolution is a personalized EPG which uses semantics to be able to advise viewers what to watch based on their interests. iFanzy is a personal EPG. It allows users to use or create custom skins and knows what they like to see. It also records these programs so that the viewer no longer has to depend on a broadcaster's time schedule but watch a program at the moment of choice.

EPGs are typically sent within the network broadcast transport stream or in a special data channel. For example, the Advanced Television Systems Committee (ATSC) standard for Digital Television (DTV) uses tables sent in each station's Program and System Information Protocol (PSIP). These tables contain the program start time and title, and additional program descriptive metadata for the set-top box to assemble.

Some EPG systems use third party metadata aggregators such as Tribune TV Data, Gemstar-TV Guide, and others, to provide data content. Newer media centers such as Personal Computer (PC) based multi-channel TV recorders and digital video recorders may use the Internet for an EPG. This enables two-way interactivity for the user so that media download may be requested via the EPG and remote programming of the media center may be enabled using IceTV and MythTV.

In developing EPG software, manufacturers must include functions to address the growing volumes of increasingly complex data associated with programming. This data includes program descriptions, schedules, ratings, user configuration information such as favorite channel lists, and multimedia content. To meet this need, some set-top box software designs incorporate a database layer that uses either proprietary functions or an embedded database for sorting, storing and retrieving programming data.

With consumers being offered so many network channels from any number of television, cable, or satellite service providers, consumers may take some time to become familiar with the channel references for their favorite networks. While some EPGs have a favorite channels function, that function is only for one set-top box. Once familiar with a service provider's channel line-up (network-to-channel mapping) available at one region, it becomes a problem for those who then move to another region, visit another region or travel. Even changing from one television/cable/satellite service provider to another while remaining at the same region is problematic since each provider may have a different channel line-up. Even the same provider may change their channel line-up occasionally due to programming changes by adding new channels or removing existing channels. For those who travel, each geographic region will most likely have a different channel line-up.

FIG. 1 shows four abbreviated channel line-ups 101 by service provider A and service provider B at regions 1 and 2. At the viewer's (subscriber's) residence located in region 1, the viewer may have a set of regularly viewed networks (NBC, ESPN2, A&E, The Learning Channel, The Science Channel, HBO HD) with a familiar channel line-up (10, 30, 40, 50, 110, 300) 103 by cable service provider A. Next door, also located in region 1, satellite service provider B may offer the viewer's favorite networks, but with a different channel line-up 105.

In region 2, 150 miles away, service provider A offers the viewer's favorite networks, but region 2 has a different channel line-up 107. Also in region 2, satellite service provider B offers the viewer's favorite networks, also having a different channel line-up 109. The channel line-ups 103, 105, 107 and 109 may be associated with a respective service provider headend 111, 113, 115 and 117.

Channel line-ups become more problematic as the number of channels offered by service providers increase. Many service providers offer subscribers hundreds of different channels to choose from. A viewer away from their normal region and service provider may have to scroll through hundreds of channels or enlist searches to locate favorite networks.

What is desired are systems and methods that allow for a viewer to locate favorite networks quickly by having the same channel line-up available regardless of region and service provider.

SUMMARY OF THE INVENTION

The inventors have discovered that it would be desirable to have systems and methods that allow a viewer to access network programming using channel references made at a preferred region at any region where the same network programming is made available.

One aspect of the invention provides a mobile intelligent device based system that translates between different program guides by different service providers and viewing regions. Systems according to this aspect of the invention include a mobile intelligent device, a mobile device application that is loaded in the mobile intelligent device, configured to store a viewing location service provider's channel line-up, an alternate region service provider's channel line-up and a viewing location's set-top box remote control command codes, and a set-top box, configured to communicate wirelessly with the mobile intelligent device wherein the mobile intelligent device accepts an alternate region channel identifier input associated with a network familiar at the alternate region, and translates the network to a viewing location channel identifier, a remote control command code corresponding to the viewing location channel identifier is output for transmission to the set-top box.

One aspect of the invention provides a computer implemented method for universal channel selection in different regions using a mobile device application. Methods according to this aspect of the invention include accessing, by the mobile device, an Internet website for universal channel selection configuration, selecting a current region where viewing is to take place, selecting a service provider from a plurality of service providers servicing the current region, downloading channel line-up information to the mobile device, and selecting a channel for viewing on the mobile device application.

Another aspect of the invention is an application for loading in a mobile intelligent device comprising code means for, when executed on the mobile intelligent device, instructing the mobile intelligent device to control steps in a method for translating between two different channel/network program guides. Methods according to this aspect of the invention include linking the mobile intelligent device with a configuration site, selecting a service provider for a viewing location, and selecting a service provider for an alternate location.

Another aspect of the method is mapping channels associated with networks from the selected alternate location's service provider, to the same networks associated with channels from the selected viewing location's service provider, assembling a translated program guide that shows channels associated with networks familiar at the alternate location, and downloading the translated program guide to the mobile intelligent device, wherein a selected channel outputs a channel from the selected viewing location's service provider that corresponds to the same network.

Another aspect of the method is downloading a selected viewing location's service provider's channel/network program guide to the mobile intelligent device, downloading a selected alternate region's service provider's channel/network program guide to the mobile intelligent device, mapping channels associated with networks from the selected alternate location's service provider, to the same networks associated with channels from the selected viewing location's service provider, and assembling a translated program guide that shows channels associated with networks familiar at the alternate location, wherein a selected channel outputs a channel from the selected viewing location's service provider that corresponds to the same network.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 6, 6A and 6B are an exemplary program guide translation method for a mobile intelligent device.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions for accessing network programming using channel references made at a preferred region at any region where the same network programming is made available. The invention may be implemented as a modular framework and deployed as software as an application program tangibly embodied on a program storage device. The application code for execution can reside on a plurality of different types of computer readable media known to those skilled in the art.

Embodiments allow a viewer to access a familiar channel line-up that is the viewer's service provider's at their normal region, at other regions and with other service providers. Embodiments make use of an added set-top box function, an adjunct module, and/or a mobile intelligent device that translates different program guides by different service providers and regions.

Figure 1:
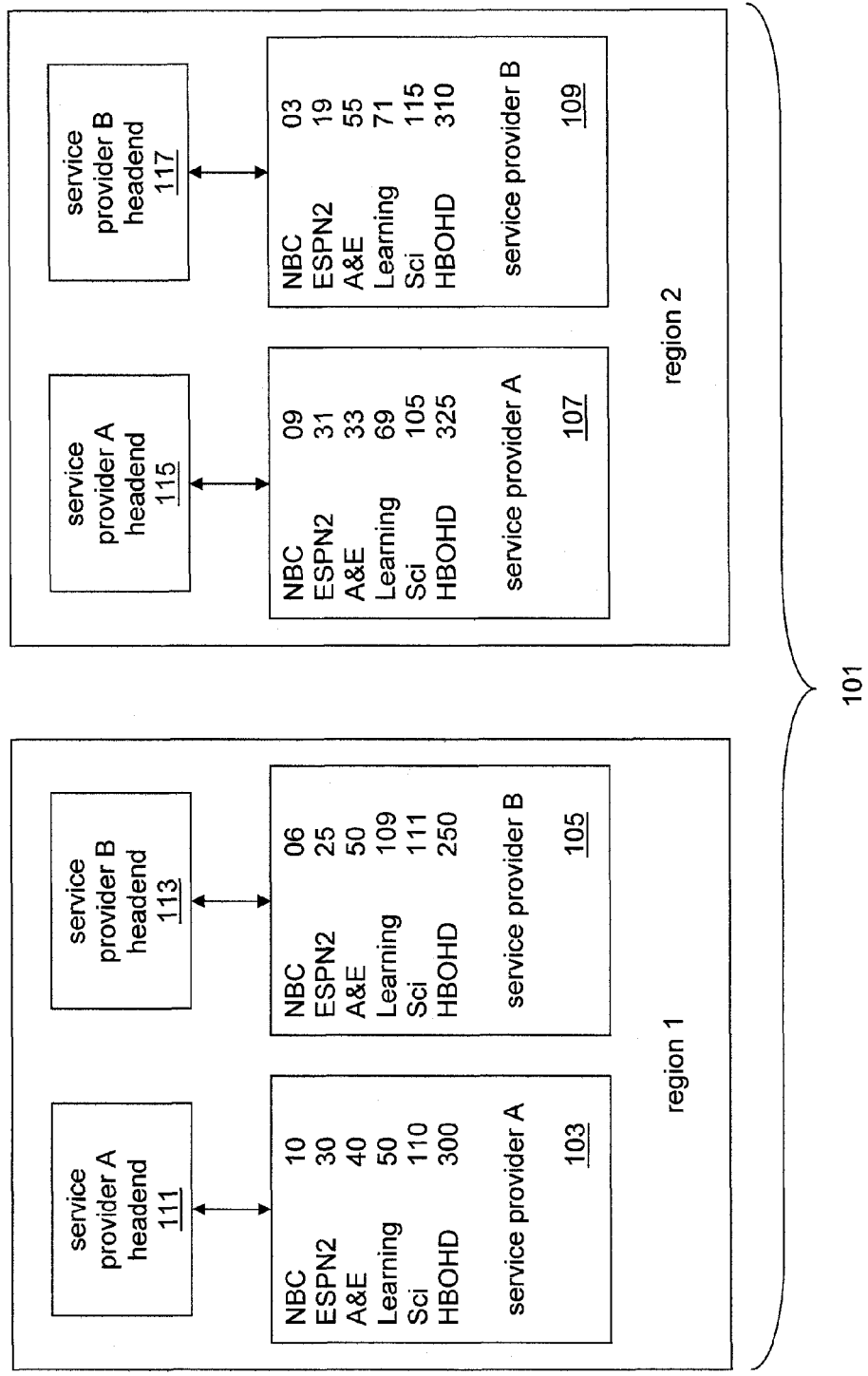
FIG. 1 is an exemplary channel line-up by service provider and region.
Figure 2:
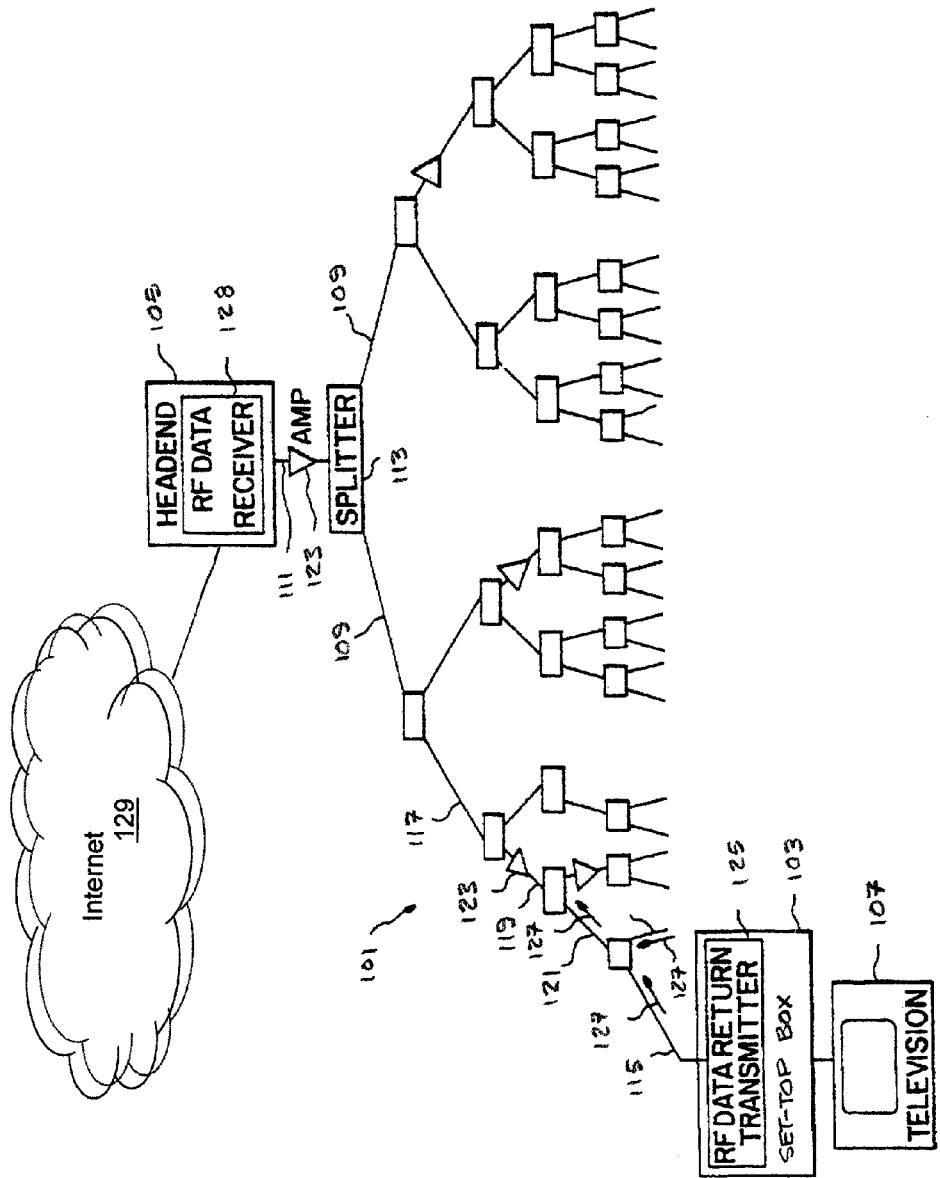
FIG. 2 is an exemplary cable television topology.

FIG. 2 shows a topology of a typical cable television distribution plant 101 for distributing television signals downstream (forward frequencies) to a viewer and for receiving return path messages (reverse frequencies) from a subscriber set-top box 103. The cable plant 101 couples a headend 105 to multiple subscriber televisions 107 through set-top boxes 103.

The cable plant 101 architecture follows a tree and branch 109 structure. The headend 105 is at the top of the tree and the set-top boxes 103 are located throughout the trunk and branches. The distribution plant 101 begins with a coaxial or fiber optic trunk line 111 coupled to the headend 105. Some portions of the cable plant 101 may use optical fiber cables instead of coaxial transmission cables.

At points where the coaxial transmission cable divides, signal splitters/combiners 113 are installed. Drop lines 115, branch lines 109, 117, 119, 121 and trunk line 111 provide the bidirectional transport medium between the headend 105 and set-top boxes 103 within the cable system. The cable subscribers typically receive the same broadband CATV signal sent from the headend 105. Signal amplifiers 123 are distributed throughout the cable plant 101 to boost a transmitted signal and ensure that nominal signal strength levels are maintained. Signal boosting amplifiers 123 are capable of bidirectional amplification.

A frequency agile RF data return transmitter 125 is included in the set-top box 103 and allows a subscriber to communicate with the headend 105 by transmitting messages in the return direction 127 in the cable plant 101. The headend 105 includes a frequency agile RF data receiver 128 for receiving messages transmitted by multiple return transmitters 125. The headend 105 is also coupled to the Internet 129.

Satellite television is different than cable since it does not require local infrastructure. Satellite operates by equipping viewing locations with satellite dishes that receive signals from a remote satellite. However, some systems may be one or two-way that effects a return transmission back to the satellite provider's headend. To receive satellite television, a satellite receiver set-top box is coupled to the satellite dish which demodulates and converts the satellite signals to the desired form for television, audio, data, etc.

While satellite television distribution is not terrestrial, the headend/set-top box paradigm is similar. EPGs are typically assembled from forward frequency transmissions from a headend to a set-top box over a period of time, and are updated periodically. The EPGs are stored in video memory. An Operating System (OS) resident in the set-top box assists in generating an On-Screen Display (OSD) and interactivity between the set-top box and a controlling device such as a remote control.

The remote control may include an IR transmitter with the set-top box including an IR receiver over which medium transports encoded signals that allow the set-top box to respond to a plurality of commands issued by the remote control such as numeric keys for direct channel entry/selection and commands such as "menu", "enter", "exit", "page" and cursor controls "up", "down", "left", "right" and others to navigate the EPG.

Figure 3:
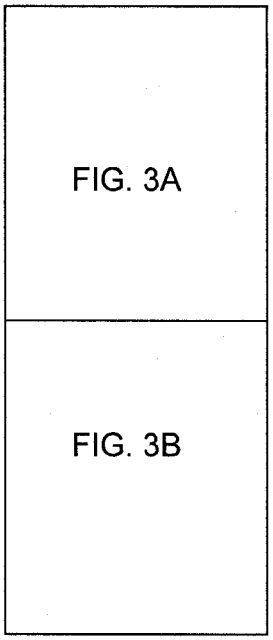
FIGS. 3, 3A and 3B are an exemplary program guide translation method.
Figure 3A:
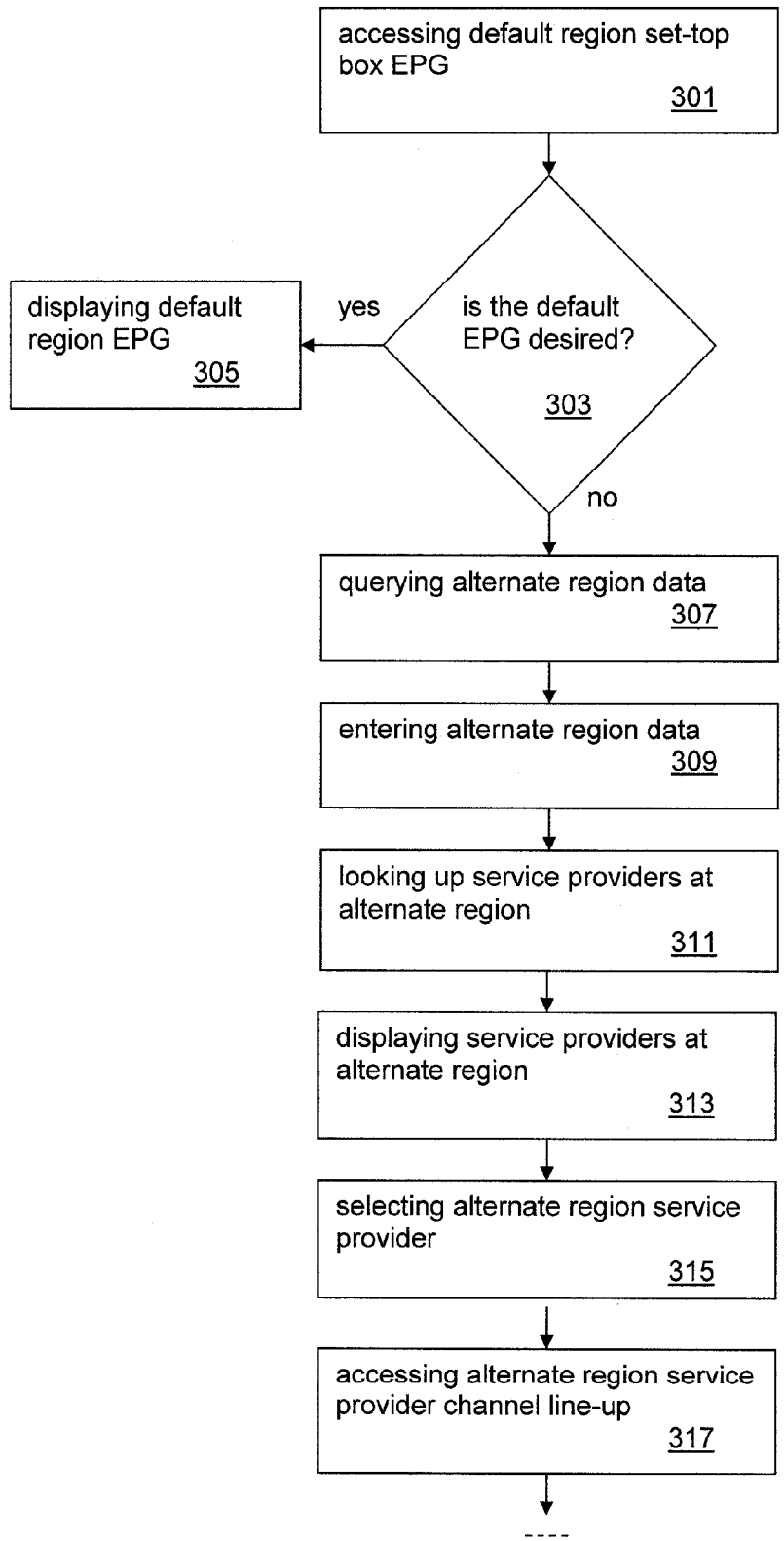
Figure 3B:
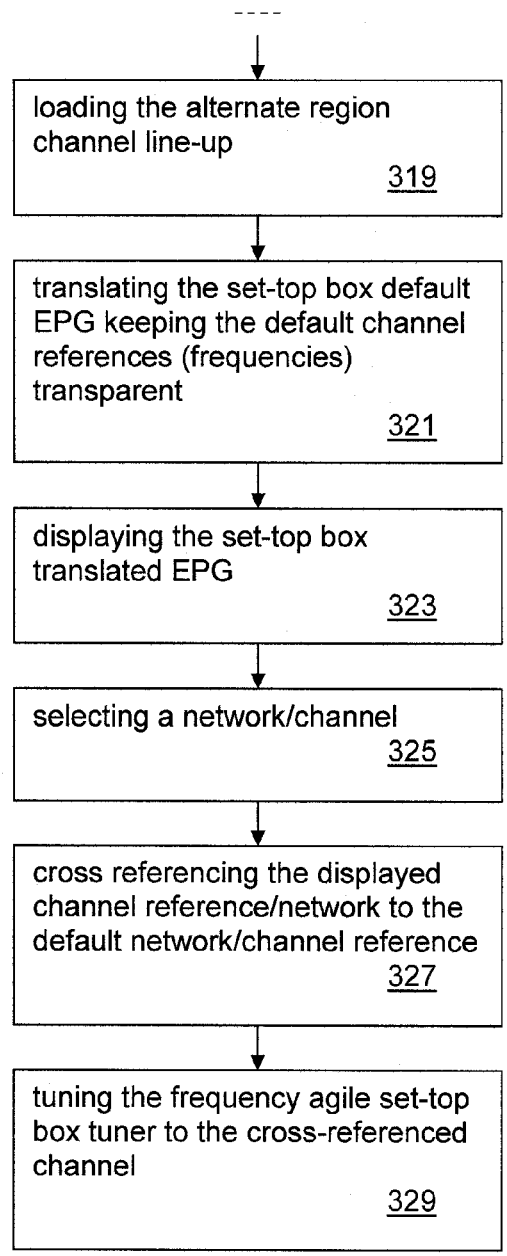

One embodiment is a function added to a preexisting EPG. FIGS. 3, 3A and 3B show a method and FIG. 4 a system framework for translating a set-top box default program guide to a set-top box translated program guide that the viewer is familiar with.

If a viewer is satisfied with the network (channel) they are currently watching no action is taken. If the viewer is a zapper, or channel surfs, an EPG is displayed in response to the menu function (step 301). Zappers do not remain on one channel for long, but continually skip from program to program, stopping for only a few minutes at a time on a particular channel whereas a channel surfer quickly scans through different television channels in order to find something interesting to watch.

When the EPG (menu) is brought into view, the EPG queries the viewer whether a default EPG representing the present region is desired (step 303). If the default EPG is acknowledged, the set-top box responds by displaying the previously assembled EPG from the cable headend (step 305).

If an alternate region EPG is desired, for example one from another region (state) or another service provider, for example, satellite if viewing cable, the EPG prompts the viewer to enter alternate region data (steps 307, 309). The data may be in the form of postal codes, state identification, address, or other indicia. A look-up is performed based on the entered alternate region data and a listing of service providers for that region is displayed (steps 311, 313). The look-up may use several different methods to acquire the alternate service provider data.

The set-top box may communicate with the headend, and in turn, the headend sends agents or bots via a network such as the Internet 129 searching for service providers available at the alternate region. With the service provider(s) identified, the headend may contact that service provider's Uniform Resource Locator (URL) using agents, or an Internet service that offers channel line-ups for all service providers. The headend acquires the channel line-up data comprising network identification, e.g. NBC, and network channel assignment, e.g. 10, and forwards the data to the requesting viewer's addressable set-top box. The set-top box receives the data which comprises one channel line-up, or if more than one service provider is available at the alternate region, more than one channel line-up.

The viewer chooses a service provider (step 315). The alternate region channel line-up provides translation with the previously assembled, default EPG (step 317). Since the set-top box default EPG contains program, program description, time slot, and other information, the alternate region channel line-up translates the default channel line-up by associating the alternate region channel line-up, channel 10/network NBC 103, with the set-top box default EPG channel line-up, network NBC/channel 09 107. The set-top box default EPG channel line-up does not change since network/channel frequency assignments are in agreement with the headend. The alternate region service provider channel line-up may have the same number of networks available as the set-top box default EPG, or may have less or more.

The network/channel line-up is downloaded into memory resident at the requesting addressable set-top box (step 319). The set-top box default EPG is translated according to the alternate region channel line-up. The set-top box default EPG is translated and reordered according to the commonality between the networks offered by the alternate region service provider and the networks offered by the set-top box service provider (step 321).

Figure 4:
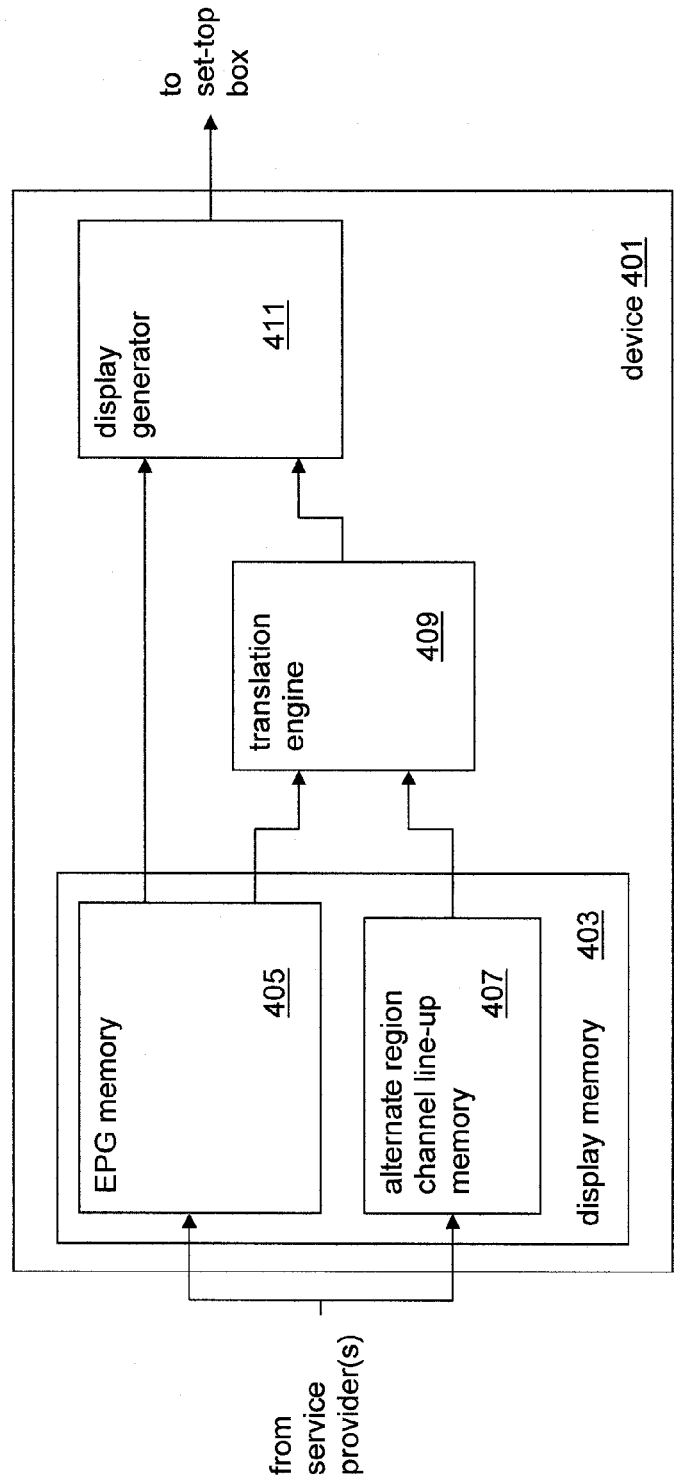
FIG. 4 is an exemplary system framework.

FIG. 4 shows the functionality added to an intelligent device 401 such as a set-top box 103. Display memory 403 includes EPG memory 405 and alternate region channel line-up memory 407. A translation engine 409 is coupled to the EPG memory 405 and alternate region memory 407. The translation engine 409 associates the alternate region channel numbers (which are familiar to the viewer) with the set-top box default EPG channel numbers (which are not familiar to the viewer) via common networks. In this manner, the set-top box default EPG maintains its predetermined channel/network frequency associations per the provider's headend assignments. The set-top box default program guide may be displayed via a display generator 411.

Figure 5:
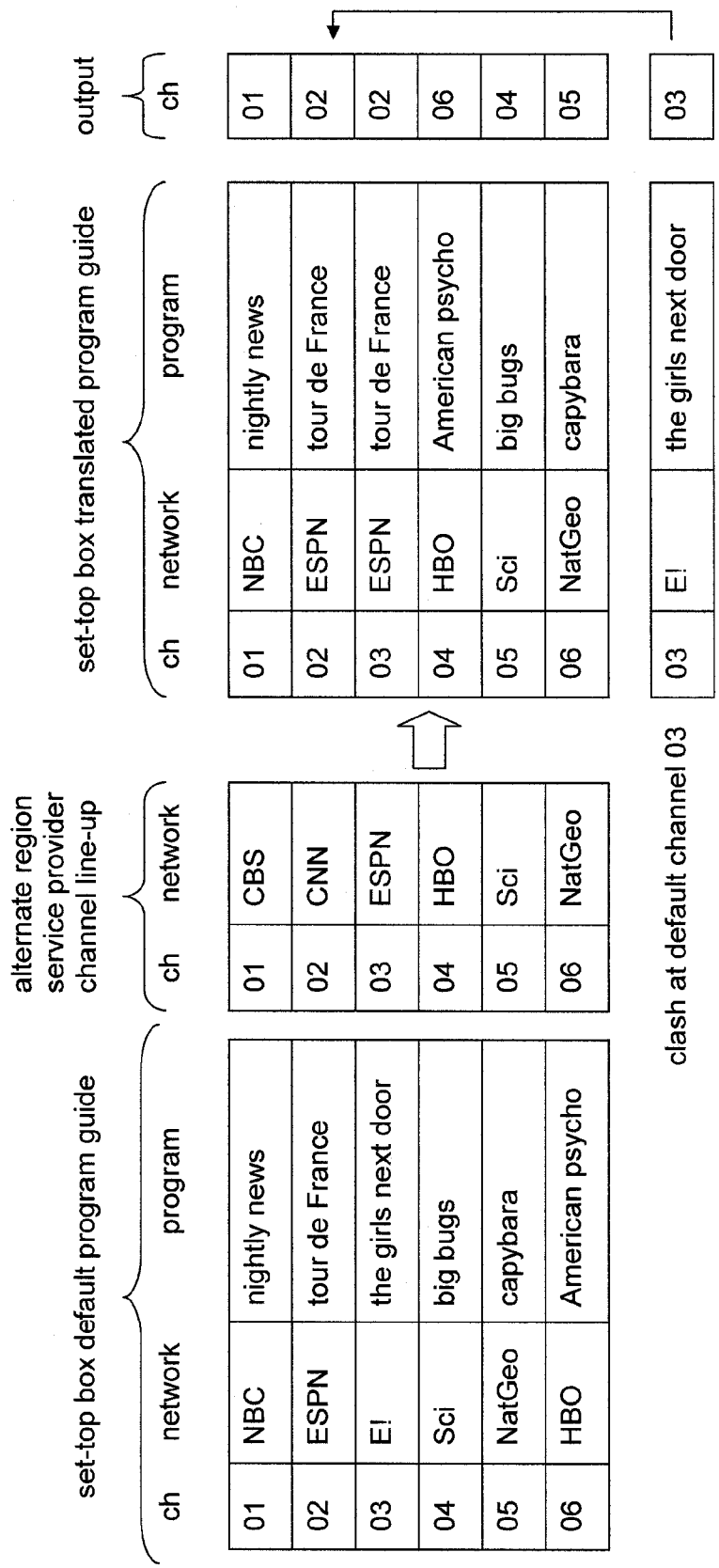
FIG. 5 is an exemplary program guide translation, correlating the alternate region channel line-up with a set-top box default program guide.

FIG. 5 shows an exemplary, abbreviated set-top box default program guide, an exemplary alternate region channel line-up and a resulting translated set-top box program guide.

For networks that are offered by the alternate region channel line-up, but are not offered by the default EPG, no translation is possible since the network is not available at that region. For example, if the alternate region channel line-up includes CNN at channel 02, but the set-top box default EPG does not offer it, the network residing at channel 02 in the set-top box default EPG remains in the set-top box translated EPG.

For networks that are not offered by the alternate region channel line-up, but are offered by the default EPG, no translation is necessary. For example, if the alternate region channel line-up does not include E!, but the set-top box default EPG includes E! at channel 03, E! at channel 03 in the set-top box default EPG would remain in the set-top box translated EPG so long as there are no clashes.

FIG. 5 shows a clash at channel 03 in the set-top box translated EPG. Channel 03 corresponds with ESPN in the alternate region channel line-up and for familiarity, in the set-top box translated EPG. E! is also at channel 03.

The translation engine 409 would assign channel 03 to ESPN which would output as channel 02. Since the alternate region channel line-up did not offer E!, a clash at channel 03 occurs. For clashes, channel 03 is translated to ESPN in the set-top box translated EPG for familiarity and the network E! may be dropped, or reassigned to a duplicate channel such as channel 02 which is also ESPN since channel 02 was not reordered.

If all of the networks offered by the alternate region channel line-up are offered by the set-top box default EPG, the set-top box translated EPG is effectively a reordered set-top box default EPG according to the alternate region channel line-up. The actual presentation of the set-top box translated EPG is the set-top box default EPG, but with networks renumbered matching the alternate region channel line-up and reordered accordingly.

In one variant, the set-top box contains a complete listing of all service providers by region and their channel line-ups in the alternate region channel line-up memory 407. As the set-top box default EPG is assembled, and periodically updated 405, the service provider/channel line-up data 407 is assembled and updated. Since an alternate region service provider channel line-up comprises a service provider name, region indicia, and a list of networks and channel number associations, the memory 407 requirements are minimal.

Another variant stores the complete listing of all service providers by region and their channel line-ups updated at the headend 105. The set-top box 103 communicates with the headend 105 if an alternate region channel line-up is desired, and the alternate region channel line-up is downloaded to memory 407 in the set-top box for the set-top box translated EPG.

The viewer may select from the displayed set-top box translated EPG a familiar network/channel, such as 05 which corresponds with Sci to watch programming about big bugs at the viewing region (steps 323, 325). The set-top box cross references the alternate region channel with the set-top box default EPG channel and tunes the frequency agile tuner according to the channel output (steps 327, 329). Aside from querying the viewer one-time, the operation is transparent for the remainder of the viewing or listening session.

Embodiments add the alternate region service provider channel line-up functionality to mobile intelligent devices such as remote controls (universal), advanced cellular phones (Palm Treo, Blackberry), laptop computers, mini-notebook computers, Personal Digital Assistants (PDAs) (Palm Pilot) and others. The functionality shown in FIG. 4 is added to a mobile intelligent device which may be executed as either hardware, software or a combination. The mobile intelligent device may also include wired connectivity, such as USB or Firewire, and wireless connectivity, such as Wireless Fidelity (Wi-Fi) WLAN 802.11, Bluetooth, wireless Universal Serial Bus (USB) and/or IR communications capability. Either the IR or wireless interface communicates with a set-top box to control it. A wireless interface may be added to the mobile intelligent device via USB, for example. For mobile intelligent device embodiments, a set-top box is not altered.

Figure 6A:
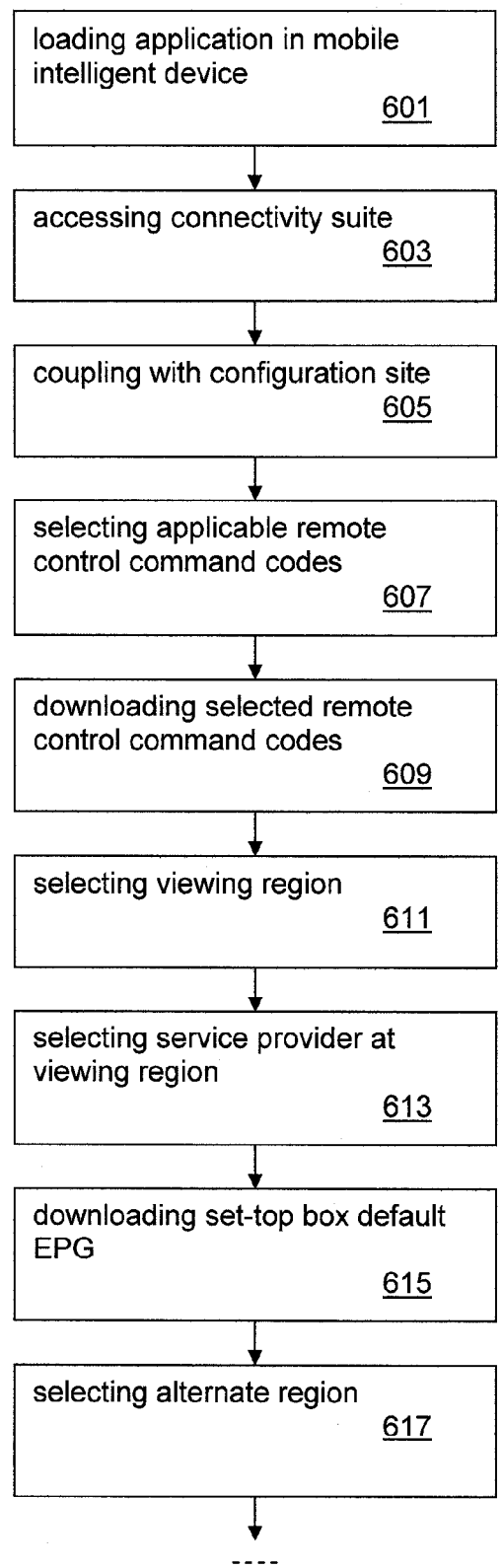
Figure 6B:
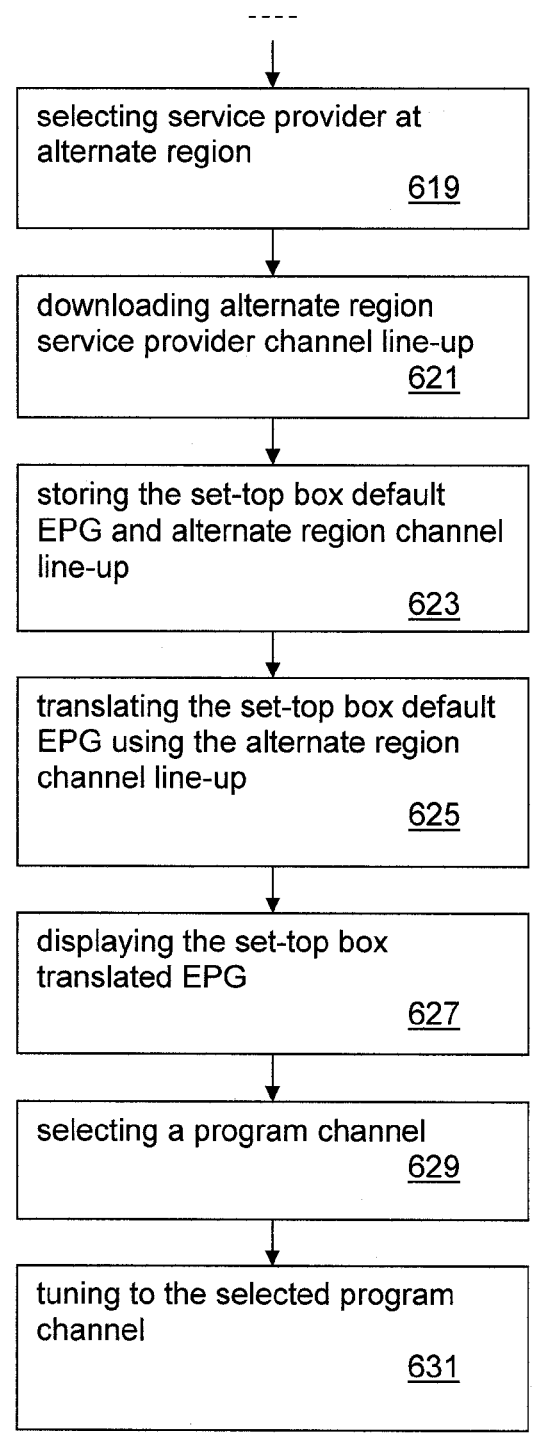

The wireless connectivity may be used to connect keyboards, headsets, and many other accessories, and for coupling to Wi-Fi hotspots or wireless networks. An Infrared Data Association (IrDA) port allows communication between any device with an IrDA port or adapter. The IrDA port allows for short-range exchange of data over infrared light. IrDA interfaces are commonly used in mobile intelligent devices. The wired and wireless connectivity allows the mobile intelligent device to communicate with a set-top box and receive update alternate service provider channel line-up information. FIGS. 6, 6A and 6B show a method.

An application is loaded in the mobile intelligent device (step 601). The mobile intelligent device stores remote control command codes allowing the mobile intelligent device to control a set-top box via commands sent by the wireless connectivity (IrDA or RF) and received by the set-top box. This aspect is similar to universal remote controls where manufacturer codes for remote controlled devices are stored in a vendor location such as a website and downloaded to the universal remote. The wireless connectivity allows for the downloading of set-top box default EPGs and alternate region service provider channel line-ups (step 603). Both the set-top box default EPGs and alternate region service provider channel line-ups are periodically updated via the wireless connectivity.

To configure the application, a viewer would launch the application which links the viewer via URL to an Internet website containing remote control command codes for a plurality of manufacturers' set-top boxes (step 605). The viewer selects the applicable code set from a menu (step 607). The selected remote control command codes are downloaded to the mobile intelligent device (step 609).

The same website, or a linked website, may contain service provider set-top box default EPGs for all regions and service provider alternate region channel line-ups. As taught above, the viewer would select the current region where viewing is to take place (step 611) and select a service provider there (step 613). The set-top box default EPG is downloaded to the mobile intelligent device (step 615).

The viewer selects an alternate region after entering data (step 617) for service providers at the alternate region (step 619) and selects an alternate region channel line-up the viewer is familiar with. The alternate region channel line-up is downloaded to the mobile intelligent device (step 621). The downloads to the mobile intelligent device may be over the Internet, via wired or wireless connectivity, and loaded into memory and stored (step 623).

When the application is in use, it brings into view a set-top box translated EPG as taught above which is the set-top box default EPG translated in accordance with the alternate region channel line-up (steps 625, 627). The viewer may navigate the EPG using a pointing device such as a mouse, touch pad, scroll wheel, cursor keys, and others, to select a program to view or listen to (step 629). Since the application replicates the set-top box default EPG as a set-top box translated EPG, the default EPG resident in the set-top box is not accessed. The viewer actions regarding navigating through the set-top box translated EPG are contained in the application resident in the mobile intelligent device and only command the set-top box when a channel selection is made or a higher level command such as for program description or premium On-demand or PPV content (step 631).

The above application may scale the set-top box translated EPG depending on the size of the view offered by the mobile intelligent device. For small displays, the set-top box translated EPG data columns may wrap.

In other variants, all the components may be housed within a television, a set-top box, remote control or other mobile intelligent device. In one example, a user would provide identifying information such as their zip code, name, service provider, etc. and the system would reconcile or correlate their favorite channel designations with the new ones so that all the favorite channel designations from the prior system/location/designation would be the same at the new system/location/provider when using the channel selector.

In another embodiment, an intelligent portable device, such as an intelligent remote prompts the user for some information related to their home provider. This information may include at least one of their zip code, city, state, service provider or type of service. Once the user inputs this information into the device, the user may utilize their home provider channels despite being in a remote provider region. The intelligent device accepts the home provider channel input and converts or translates the home channel input into the remote channel for transmission to the set-top box. For example, if the user is located in West Hartford, Conn. and uses Comcast for their local service provider and has traveled to New York, N.Y., where the service provider is Time Warner, the user would still be able to use their familiar West Hartford, Conn., Comcast channel designations via the intelligent remote. In this manner, the channel conversion process is transparent to the set-top box.

One or more embodiments of the present invention have been described. Nevertheless, it will be understood that various modifications may be made without departing from the spirit and scope of the invention. Accordingly, other embodiments are within the scope of the following claims.

What is claimed is:

1. A mobile intelligent device based system that translates between two different channel/network line-ups comprising:
   a mobile intelligent device;
   a mobile device application that is loaded in the mobile intelligent device, configured to store a viewing service provider's channel/network line-up and an alternate service provider's channel/network line-up wherein the mobile device application links the mobile intelligent device to one or more Internet websites storing a plurality of different service providers' channel/network line-ups and downloads a selected viewing service provider's channel/network line-up and a selected alternate service provider's channel/network line-up to the mobile intelligent device and associates one or more channel/network(s) offered by the selected alternate service provider with one or more network/channel(s) offered by the selected viewing service provider wherein the selected alternate service provider's channel/network line-up is capable of having the same number of networks available as the selected viewing service provider's channel/network line-up, is capable of having a lesser number of networks available as the selected viewing service provider's channel/network line-up, and is capable of having a greater number of networks available as the selected viewing service provider's channel/network line-up, to assemble a translated program guide wherein the mobile device application maintains the same channel numbers for the one or more network/channel(s) offered by both the selected viewing service provider's channel/network line-up and the one or more channel/network(s) offered by the selected alternate service provider, wherein for networks that are offered by the selected alternate service provider's channel/network line-up, but are not offered by the selected viewing service provider's channel/network line-up, no translation is possible since the network is absent, further wherein for networks that are not offered by the selected alternate service provider's channel/network line-up, but are offered by the selected viewing service provider's channel/network line-up, no translation is necessary, the mobile device application configured to identify translated channel clashes where clashes are channels that correspond to networks not offered by the selected alternate service provider's channel/network line-up, but are offered by the selected viewing service provider's channel/network line-up, but duplicate channels in the selected alternate service provider's channel/network line-up, the mobile device application also configured to reassign networks having duplicate channel(s) offered by the selected viewing service provider's channel/network line-up to channels not offered by the selected alternate service provider's channel/network line-up.

2. The system according to claim 1 wherein the mobile device application is further configured to link the mobile intelligent device to one or more Internet websites storing remote control command codes for a plurality of service provider's set-top boxes and download a selected viewing service provider's remote control codes for a set-top box to the mobile intelligent device.

3. The system according to claim 2 wherein the mobile device application is further configured to accept an alternate service provider channel identifier input associated with a network familiar with the alternate service provider, cross reference the selected alternate service provider channel identifier with the selected viewing service provider's channel/network line-up and output a remote control command code corresponding to the viewing service provider channel identifier.

4. The system according to claim 3 wherein the mobile intelligent device is further configured to output the remote control command code via Wi-Fi or infrared.

5. The system according to claim 1 wherein the mobile intelligent device is further configured to update the selected viewing service provider's channel/network line-up and alternate service provider's channel/network line-up via a wireless network.

6. The system according to claim 1 wherein the mobile intelligent device is a cellular telephone having Wi-Fi connectivity.

7. An application for loading in a mobile intelligent device comprising code means for, when executed on the mobile intelligent device, instructing the mobile intelligent device to control steps in a method for translating between two different channel/network line-ups comprising:
  linking the mobile intelligent device to one or more Internet websites storing a plurality of different service providers' channel line-ups;
  selecting a viewing service provider;
  downloading the selected viewing service provider's channel/network line-up to the mobile intelligent device;
  selecting an alternate service provider;
  downloading the selected alternate service provider's channel/network line-up to the mobile intelligent device;
  translating the selected viewing service provider's channel/network line-up using the channel/network line-up for the selected alternate service provider wherein the selected alternate service provider's channel/network line-up is capable of having the same number of networks available as the selected viewing service provider's channel/network line-up, is capable of having a lesser number of networks available as the selected viewing service provider's channel/network line-up, and is capable of having a greater number of networks available as the selected viewing service provider's channel/network line-up, to assemble a translated program guide wherein the mobile device application maintains the same channel numbers for the one or more network/channel(s) offered by both the selected viewing service provider's channel/network line-up and the one or more channel/network(s) offered by the selected alternate service provider, wherein for networks that are offered by the selected alternate service provider, but are not offered by the selected viewing service provider, no translation is possible since the network is absent, and for networks that are not offered by the selected alternate service provider, but are offered by the elected viewing service provider, no translation is necessary;
  identifying translated channel clashes wherein clashes are channels that correspond to networks not offered by the selected alternate service provider, but are offered by the selected viewing service provider, but duplicate channels in the selected alternate service provider's channel/network line-up and reassigning networks having duplicate channel(s) offered by the selected viewing service provider to channels not offered by the selected alternate service provider;
  maintaining the same channel reference numbers for all of the channels that are offered by both the selected viewing service provider and the selected alternate service provider; and
  displaying a translated program guide.

8. The method according to claim 7 further comprising:
  linking the mobile intelligent device to one or more Internet websites storing remote control command codes for a plurality service providers' set-top boxes;
  selecting the viewing service provider's remote control codes for a set-top box; and
  downloading the selected remote control codes to the mobile intelligent device.

9. The method according to claim 8 further comprising:
  selecting an alternate service provider channel identifier associated with a network familiar with the alternate service provider;
  cross referencing the selected alternate service provider channel identifier with its corresponding viewing service provider channel identifier; and
  outputting a remote control code corresponding to the viewing service provider channel identifier.

10. The method according to claim 9 wherein outputting a remote control command code is via Wi-Fi or infrared.

11. The method according to claim 7 further comprising periodically updating the selected viewing service provider's channel/network line-up and alternate service provider's channel/network line-up via a wireless network.

12. The method according to claim 7 wherein the mobile intelligent device is a cellular telephone having Wi-Fi connectivity.

13. An application for loading in a mobile intelligent device comprising code means for, when executed on the mobile intelligent device, instructing the mobile intelligent device to control steps in a method for translating between two different channel/network line-ups comprising:
  linking the mobile intelligent device to one or more Internet websites storing a plurality of different service providers' channel line-ups;
  selecting a viewing service provider;
  selecting an alternate service provider;
  translating the selected viewing service provider's channel/network line-up using the channel/network line-up for the selected alternate service provider wherein the selected alternate service provider's channel/network line-up is capable of having the same number of networks available as the selected viewing service provider's channel/network line-up, is capable of having a lesser number of networks available as the selected viewing service provider's channel/network line-up, and is capable of having a greater number of networks available as the selected viewing service provider's channel/network line-up, to assemble a translated program guide wherein the mobile device application maintains the same channel numbers for the one or more network/channel(s) offered by both the selected viewing service provider's channel/network line-up and the one or more channel/network(s) offered by the selected alternate service provider, wherein for networks that are offered by the selected alternate service provider, but are not offered by the selected viewing service provider, no translation is possible since the network is absent, and for networks that are not offered by the selected alternate service provider, but are offered by the elected viewing service provider, no translation is necessary;

identifying translated channel clashes wherein clashes are channels that correspond to networks not offered by the selected alternate service provider, but are offered by the selected viewing service provider, but duplicate channels in the selected alternate service provider's channel/network line-up and reassigning networks having duplicate channel(s) offered by the selected viewing service provider to channels not offered by the selected alternate service provider;

maintaining the same channel reference numbers for all of the channels that are offered by both the selected viewing service provider and the selected alternate service provider;

downloading the translated program guide to the mobile intelligent device; and displaying the translated program guide.

14. The method according to claim 13 further comprising:
linking the mobile intelligent device to the Internet configuration website storing remote control command codes for a plurality service providers' set-top boxes;
selecting the viewing service provider's remote control codes for a set-top box; and
downloading the selected remote control codes to the mobile intelligent device.

15. The method according to claim 14 further comprising:
selecting an alternate service provider channel identifier associated with a network familiar with the alternate service provider;
cross referencing the selected alternate service provider channel identifier with its corresponding viewing service provider channel identifier; and
outputting a remote control code corresponding to the viewing service provider channel identifier.

16. The method according to claim 15 wherein outputting a remote control command code is via Wi-Fi or infrared.

17. The method according to claim 13 further comprising periodically updating the selected viewing service provider's channel/network line-up and alternate service provider's channel/network line-up via a wireless network.

18. The method according to claim 13 wherein the mobile intelligent device is a cellular telephone having Wi-Fi connectivity.

* * * * *